Patented Apr. 12, 1938

2,113,951

UNITED STATES PATENT OFFICE 2,113,951

PROCESS OF REFINING COMMERCIAL PHENOLIC COMPOUNDS

Royal L. Shuman, Newark, N. J., assignor to Celluloid Corporation, a corporation of New Jersey No Drawing. Application March 29, 1934, Serial No. 717,954

6 Claims. (Cl. 260—154)

This invention relates to the preparation of light, heat, an ageing stable aryl esters of phosphoric acid and more particularly to the refining of commercial cresylic acid (phenols) for use in making phenyl esters of phosphoric acid.

An object of the invention is the economic and expeditious purification of cresylic acid by removing such impurities as water, pyridine bases or other nitrogen compounds, unsaturated hydrocarbons, naphthalene, and other like impurities. Other objects of the invention will appear from the following detailed description.

By commercial cresylic acid is meant the commercially distilled phenols from coal tar or a fraction thereof having defined boiling points. It therefore includes mixtures or commercially segregated cresols, xylenol, etc. as well as phenol and impurities such as water, pyridine bases, unsaturated hydrocarbons, naphthalene etc.

The phosphoric acid esters made by the interaction of commercial phenols, obtained from the fractional distillation of coal tar acids, and phosphoryl halides even after purification treatments of the formed esters, exhibit a strong tendency to discolor upon exposure to heat and sunlight. This discoloration has been a serious disadvantage, to otherwise excellent plasticizers, in the application of the lacquers and coating compositions, films and foils containing derivatives of cellulose such as cellulose nitrate, cellulose acetate, and other derivatives of cellulose, and for gums and resins, such as gum damar, ester gum, etc. which are normally exposed to the elements.

I have found that this discoloration is caused by the impurities contained in the commercial cresylic acid. These impurities are not entirely removed by distillation and are carried into the esters either chemically or entrapped therein where they promote discoloration upon exposure. These impurities may or may not have the same or similar boiling points with the desired phenol, yet they cannot be separated by mere fractional distillation. The impurities most commonly met with are moisture, pyridine bases such as pyridine, picolines, lutidines and collidines, ammonia and its substitution products, quinoline, and similar substances. By treating, according to this invention, the commercial phenols prior to esterification, there is produced a pure grade of phenols that when formed into phenyl esters of phosphoric acid do not produce or later develop into discolored products. There is thus produced a cresylic acid free of impurities that are detrimental in making phosphoric acid esters therefrom and in plastic composition and coating material in which the phosphoric acid esters of the phenols are used as plasticizers.

According to this invention I have found that the impurities which exist in the phenols used that are not adequately removed in subsequent purification treatment after esterification and that are not removed from the phenols by direct distillation, vacuum distillation or steam distillation are however, effectively eliminated by the addition to the phenols of mineral acids, such as sulphuric hydrochloric, phosphoric, etc., acids and certain sulpho-organic acids such as benzene sulphonic acid, naphthalene sulphonic acid etc. in quantities in excess of that theoretically sufficient to form the acid salts, and subjecting the mixture to distillation preferably at reduced pressures, say from 10 to 40 mm. mercury. Although distillation under reduced pressure is preferable, steam distillation has also been found effective. For practical purposes it may be advisable to add twice the theoretical quantity of acid required to form the acid salts of the nitrogen or pyridine bases.

The quantity of pyridine bases in the phenols sufficient to produce harmful effects in the phosphoric acid esters is indeed very small. For example, a cresylic acid having a boiling range of from 193° to 212° C., containing 0.25% pyridine bases calculated as pyridine produce a tricresyl phosphate that shows marked discoloration upon exposure to heat and sunlight. The same cresylic acid after the addition of 0.66 part of 66° Bé. sulphuric acid per 100 parts of cresylic acid and vacuum distillation contained less than 0.01% pyridine bases and the tricresyl phosphate made therefrom shows a marked improvement to heat and sunlight stability.

By the addition of mineral acids, such as sulphuric acid, phosphoric acid and hydrochloric acid directly to the commercial cresylic acid in the ratio of about twice or more than the theoretical amount required to combine with the pyridine bases and other nitrogen compounds, and then distilling, the water readily distills off in the first (90 to 105° C.) and second (105° to 135–140° C.) fractions and the main fraction is practically free of moisture, pyridine bases and unsaturated hydrocarbon. Pyridine bases correspond to the general formula $C_NH_{2N-5}N$ and consist mainly of pyridine, picolines, lutidines and collidines. They are strong tertiary bases and form crystalline salts with one equivalent of mineral acids as follows:

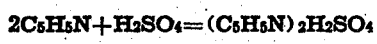

$$2C_5H_5N + H_2SO_4 = (C_5H_5N)_2H_2SO_4$$

or pyridine sulphate. These salts remain in the still residue and can be readily recovered together with any free phenols which are not distilled off during the distillation.

Any of the strong inorganic acids or the sulpho-organic acids may be employed as the salt forming acid when used in fairly concentrated form. It is preferable, however, in refining phenols on a large scale to use 66° Bé. sulphuric acid in removing the pyridine bases, other nitrogen compounds and unsaturated compounds. Any of the acids employed is preferably employed in excess of the theoretical amount required and more preferably in twice the theoretical amount.

For the purpose of further describing the invention and not as a limitation the following example is given.

*Example*

Commercial cresylic acid containing 0.25% pyridine bases calculated as pyridine is charged into a still equipped for vacuum distillation. For each 100 lbs. of cresylic acid is added 0.66 lb. of 66° Bé. sulphuric acid. Vacuum is then applied to give an absolute pressure of from 10 to 40 mm. of mercury and the charge is heated by means of steam coils, the steam pressure being regulated to give a slow flow of distillate. The first portion of distillate coming over at temperatures up to about 90° C. consists mostly of water. This fraction is collected separately and the cresylic acid separated from the water returned to the still in the next charge. A second fraction is then collected until the distillate is free from water. This fraction having a boiling range of from about 90 to 105° C. is returned to the still pot in the next charge. The distillate is then collected as the main portion until the flow practically stops at a temperature of about 135-140° C. or higher, say up to 222° C., depending upon the starting material. The residue in the still consists of the sulphuric acid salts of the pyridine bases, tar, high boiling fractions and some free phenols. The pyridine and free phenols may be recovered from the residue if desired.

The main portion of the distillate is water white, free from foreign odors and contains only traces of water (less than .05%), pyridine bases and nitrogen compounds (less than .01%). This product when reacted with phosphoryl halides produces a tricresyl phosphate which when given the usual purification treatment is far more stable to the action of heat and sunlight than when the cresylic acid is distilled without the addition of sulphuric acid or other inorganic acids.

The esterification and subsequent refining treatments may be carried out by any known process. It is preferable to heat the treated cresylic acid with phosphorous oxychloride in molecular proportions in a retort equipped with a refluxing condenser, raising the temperature to about 250° C. or higher until the evolution of hydrochloric acid gas ceases. The crude tricresyl phosphate may be then distilled under vacuum and washed with dilute aqueous alkali solution (about 3%) to remove free acids and unreacted phenols. To further purify the product to remove the last traces of color or odor, it may be treated with water soluble permanganate solutions or other decolorizing agents, such as carbon black, etc.

The refined phenolic material may be divided by fractional distillation, concurrently with or as a separate process step, either before or after the purification into fractions having definite properties and boiling range, prior to forming the phosphoric acid ester from them. Thus esters containing but one type, or even one kind of isomer of a type, may be formed for example tri-1:3:5 xylenyl phosphate, triparacresyl phosphate or triortho cresyl phosphate.

The aryl phosphate esters prepared as described above may be incorporated in cellulose derivative plastic masses in a manner similar to other plasticizers. It may be used in plastic masses in quantities from a fraction of a per cent to over 50 per cent of the weight of the derivative of cellulose present depending upon the qualities desired in the finished plastic. Molding powders comprising an organic derivative of cellulose and the aryl phosphate may also be made. The aryl phosphate prepared as described above may also be added to solutions containing cellulose derivatives from which filaments, foils, films, and straws are to be formed by either the wet or dry method of spinning and it may be added in amounts of from a fraction of a per cent to over 50 per cent of the weight of the cellulose derivative present depending upon the cross section of the filament, film or straw and the properties desired. The triaryl phosphates prepared as described above may be added as a plasticizer in lacquers and other coating compositions for waterproofing, moisture proofing and sizing to synthetic films, fabrics and paper by incorporating it in a plastic of gum or resins that are natural or synthetic. The triaryl phosphate may be added to the nitrocellulose lacquers, as a vehicle for grinding pigments, transformer oil, waxes, polishes and ink. It may be used as a modifier for rubber and resins and as a detergent in soap.

The cellulose derivative to which the triaryl phosphate may be added may be cellulose nitrates (of any degree of nitration), and organic derivatives of cellulose especially such organic derivatives of cellulose as the organic esters and ethers of cellulose. Examples of organic esters of cellulose are cellulose acetate, cellulose formate, cellulose propionate and cellulose butyrate while examples of cellulose ethers are methyl cellulose, ethyl cellulose and benzyl cellulose. The cellulose derivatives may have any desired viscosity characteristics, and nitrogen or acid content to make it suitable for use for the purpose intended as a plastic, lacquer or other known uses.

The derivative of cellulose employed, whether used in a plastic to be molded or in a solution for making filaments, films, foils and the like, or in a solution or dope for coating fabrics or other materials, may be associated with other materials in addition to the specially prepared triaryl phosphate, as the triaryl phosphate is neutral and comparatively unreactive with materials such as pigments and filling materials, dyes or lakes, softeners, other plasticizers such as dimethyl phthalate, diethyl phthalate, ethyl toluene sulphonamid and the like. Examples of pigments and filling materials are powdered metal, oxides and carbonates of metal, natural fibres, lamp black and logwood.

It is to be understood that the foregoing detailed description is merely given by way of illustration, and many alterations may be made therein without departing from the spirit of my invention.

Having described my invention what I desire to secure by Letters Patent is:

1. A process of refining commercial phenolic compounds contaminated with nitrogenous bases which comprises distilling the same under reduced pressure in the presence of strong acid in an amount substantially twice that theoretically required for the formation of the acid salts of the bases.

2. A process of refining commercial phenolic compounds contaminated with nitrogenous bases which comprises distilling the same with steam in the presence of strong acid in an amount substantially twice that theoretically required for the formation of the acid salts of the bases.

3. A process of refining commercial phenolic compounds contaminated with nitrogenous bases which comprises distilling the same under reduced pressure in the presence of sulphuric acid in an amount substantially twice that theoretically required for the formation of the sulphuric acid salts of the bases.

4. A process of refining commercial phenolic compounds contaminated with nitrogenous bases which comprises distilling the same in the presence of steam, and in the presence of sulphuric acid in an amount substantially twice that theoretically required for the formation of the sulphuric acid salts of the bases.

5. A process of refining commercial phenolic compounds contaminated with nitrogenous bases which comprises distilling the same in the presence of hydrochloric acid in an amount substantially twice that theoretically required for the formation of the hydrochloric acid salts of the bases.

6. A process of refining commercial phenolic compounds contaminated with nitrogenous bases which comprises distilling the same in the presence of a sulphonic acid in an amount substantially twice that theoretically required for the formation of the sulphonic acid salts of the bases.

ROYAL L. SHUMAN.